(No Model.)
F. P. BURCAW.
WEATHER STRIP.
No. 378,064. Patented Feb. 14, 1888.
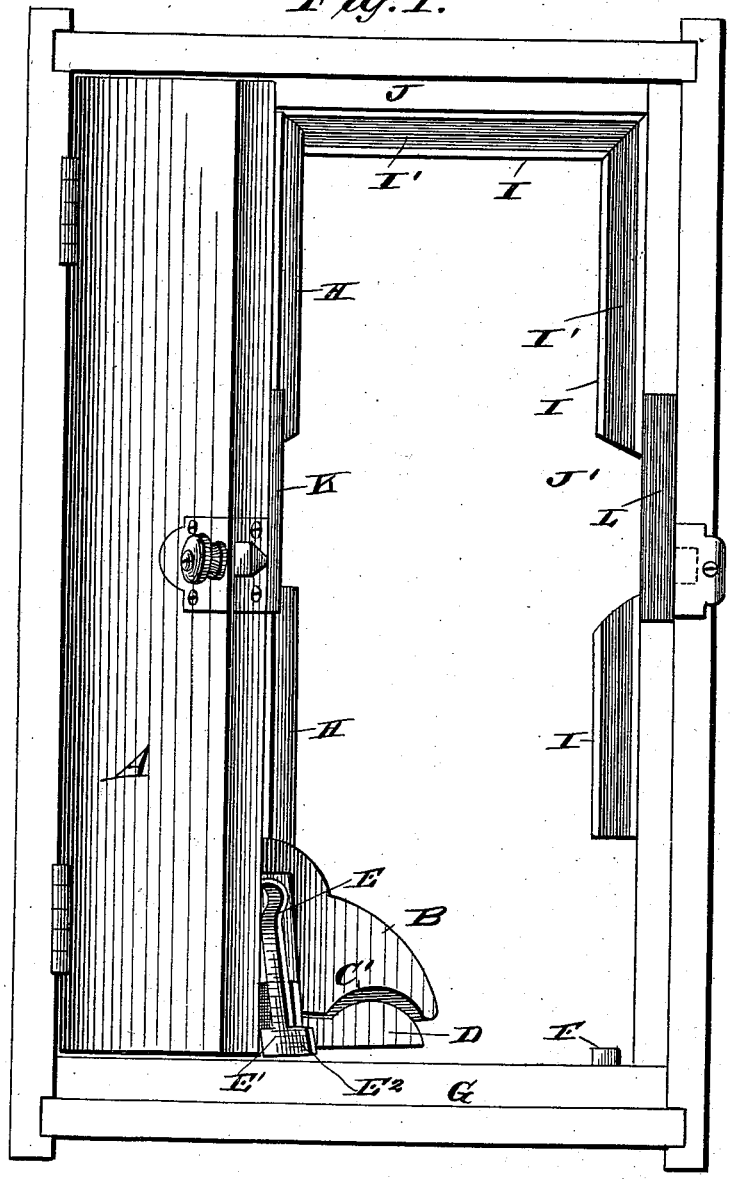
Fig. 1.
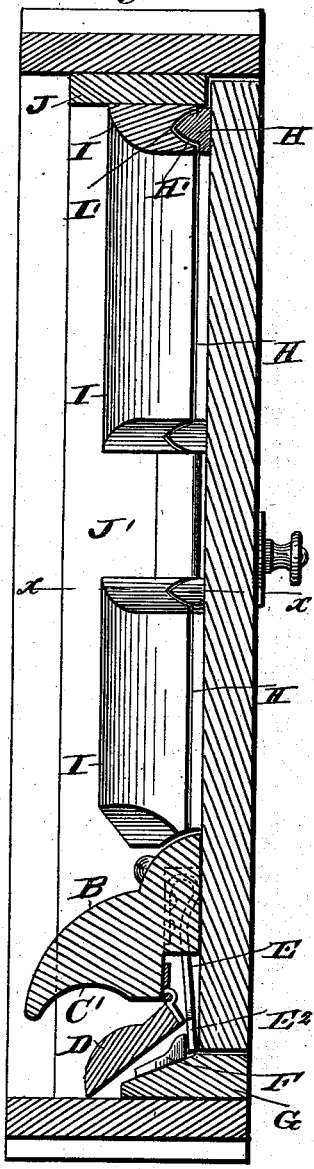
Fig. 2.
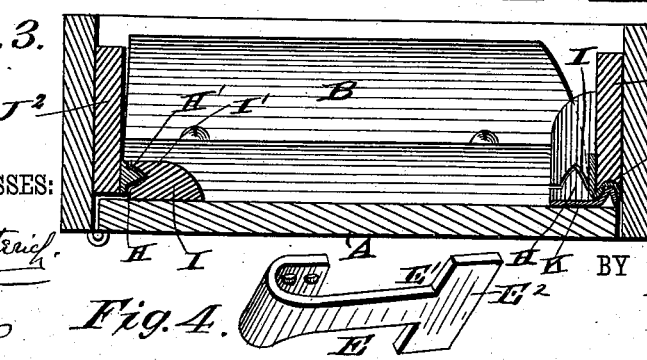
Fig. 3.
Fig. 4.
WITNESSES:
Phil. C. Dieterich.
C. Sedgwick.
INVENTOR:
F. P. Burcaw
BY Munn & Co.
ATTORNEYS.

UNITED STATES PATENT OFFICE.

FRANKLIN P. BURCAW, OF HAZLETON, PENNSYLVANIA.

WEATHER-STRIP.

SPECIFICATION forming part of Letters Patent No. 378,064, dated February 14, 1888.

Application filed September 14, 1887. Serial No. 249,634. (No model.)

*To all whom it may concern:*

Be it known that I, FRANKLIN PIERCE BURCAW, of Hazleton, in the county of Luzerne and State of Pennsylvania, have invented a new and Improved Weather-Strip, of which the following is a full, clear, and exact description.

The object of my invention is to provide a new and improved weather-strip for preventing draft all around the door.

The invention consists in the construction and arrangement of various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a front elevation of my improvement, showing the door partly open. Fig. 2 is a vertical cross-section of the same, showing the door closed; and Fig. 3 is a sectional plan view of my improvement on the line $x\ x$ of Fig. 2. Fig. 4 is a perspective of the spring.

The door A is provided near its bottom with a fixed molding, B, secured to the door with nails or screws, as may be desired, the molding B having a groove, C', in its bottom, into which fits a corresponding strip, D, hinged to the inner lower edge of said molding B, which is recessed for this purpose. A fibrous or leather strip is secured to the bottom inner edge of molding B and to the strip D, between the hinges of B and D, to close the air-space between said hinges. A spring, E, is secured at one or either end of the door A or the molding B, and projects downward at its free end, being provided at its lower end with arms E' and E², of which the arm E' presses against the back of the strip D, thus holding the latter in place in the groove C' in the bottom of the molding B. Said spring E is provided with arms on its upper end similar to the arms E' E², provided with holes for securing spring E to the door A or molding B, as may be desired. The other arm, E², of the spring E projects from one end of the strip D, and is adapted to engage a lug, F, secured to the door-sill G, so that when the door is closed said arm E² strikes against the lug F, thus pressing the spring toward the door and away from the strip D, whereby the latter swings out of the groove C' and downward until it rests on the bottom of the door-casing, as illustrated in Fig. 2, thus preventing any draft from entering under the door.

Near the upper part of the door A is placed a horizontal strip of molding, H, provided with a central offset or tongue, H', which fits snugly in a correspondingly-shaped groove, I', of the strip of molding I, secured to the top board, J, of the door-casing. On the lock side J' of the latter are arranged vertically similar strips of molding I, into which fit corresponding vertical strips H, secured to the door A, and on the other side, J², of the casing is secured vertically a strip of molding I, extending downward to the molding B and joining at its upper end the horizontal strip of molding H.

Two strips of molding, H and I, are used on the free edge of the door and on the side J' of the casing, so as to make room for a metallic V-shaped strip, L, secured by its flange to the side J', and having its V-shaped part bent to the front edge of the side J'. This strip extends the height of the door-lock. A similar metallic strip, K, is secured by its flange to the door A, and its V-shaped part fits into the V-shaped part of the strip L. The metallic strips K and L thus form a continuation of the two strips of molding H and I, above mentioned.

It will be seen that when the door is closed the bottom draft is prevented by the hinged strip D, and all side and top drafts are prevented by the moldings H, I, and L of the casing fitting into the corresponding moldings I, H, and K on the door.

Having thus fully described my invention, I claim as new and desire to secure by Letters Patent—

1. The combination, with the molding B, having a longitudinal groove, C', in its lower face, and the strip D, hinged to the inner edge of the molding and shaped on its upper edge to fit the groove C', and the plate-spring E, having laterally-projecting arms E' E² at its lower end, one of which engages the inner edge of the hinged strip to hold the strip in a horizontal position with its upper face in the groove C', and the other projects beyond the end of said strip, and a fixed projection in the path of the said projecting arm E², substantially as set forth.

2. The combination, with the door and its casing having molding respectively provided with tongue and groove, as described, the said molding being cut away or removed at the lock, of the flanged metallic V-shaped strip L, secured by its flange to the casing at the inner side thereof, where the molding is cut away or removed, and the flanged V-shaped metallic strip K, secured to the door where its molding is removed and entering the groove of the strip L, substantially as set forth.

FRANKLIN P. BURCAW.

Witnesses:
JOHN A. BARTON,
C. BACHMAN.